US009406246B2

(12) United States Patent
Gao et al.

(10) Patent No.: US 9,406,246 B2
(45) Date of Patent: Aug. 2, 2016

(54) REORGANIZING DISPLAY OF A RAILWAY TIMETABLE DIAGRAM

(71) Applicant: International Business Machines Corporation, Armonk, NY (US)

(72) Inventors: Peng Gao, Beijing (CN); Wen Ting Mo, Beijing (CN); Wei Sun, Beijing (CN); Bao Hua Wang, Beijing (CN); Feng Juan Wang, Beijing (CN); Zhi Hu Wang, Beijing (CN); Xin Zang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 13/753,691

(22) Filed: Jan. 30, 2013

(65) Prior Publication Data

US 2013/0212917 A1 Aug. 22, 2013

(30) Foreign Application Priority Data

Jan. 31, 2012 (CN) .......................... 2012 1 0021392

(51) Int. Cl.
*G06T 11/20* (2006.01)
*G09D 1/00* (2006.01)

(52) U.S. Cl.
CPC ........................................ *G09D 1/00* (2013.01)

(58) Field of Classification Search
None
See application file for complete search history.

(56) References Cited

U.S. PATENT DOCUMENTS

2010/0277481 A1* 11/2010 Cao et al. ...................... 345/440

FOREIGN PATENT DOCUMENTS

CN 101388050 A 3/2009
GB 2468745 A 2/2010

OTHER PUBLICATIONS

Tormos et al. (A Genetic Algorithm for Railway Scheduling Problems, 2008).*
Braker (Algorithms and Applications in Timed Discrete Event Systems, 1993).*
Abril et al. (Distributed search in railway scheduling problems, 2008).*
Schloegel et al. (Graph Partitioning for High Performance Scientific Simulations, 1999).*
Yang et al. (Train Timetable Problem on a Single-Line Railway With Fuzzy Passenger Demand, 2009).*
Ghosh et al. (Statistical Analysis of the Indian Railway Network: A complex Network Approach, vol. 4, 2011).*
Brandes et al. (Fast Layout Methods for Timetable Graphs, Springer, pp. 127-138, 2000).*
Zhang et al., "The Analysis and Construction of Train Routine Based on Graphics Theory", Journal of Southwest Jiotong University, vol. 35, No. 3, Jun. 2000, with English langauge Abstract.
Tormos et al., "A Genetic Algorithm for Railway Scheduling Problems", Studies in Computational Intelligence (SCI) 128, 255-276 (2008), BOOK © Springer-Vertag Berline Heidelberg 2008.

* cited by examiner

*Primary Examiner* — Kyle Zhai
(74) *Attorney, Agent, or Firm* — Scully, Scott, Murphy & Presser, P.C.; David Quinn, Esq.

(57) ABSTRACT

A method and apparatus for reorganizing display of a railway timetable diagram. A method of reorganizing the display of a railway timetable diagram, including: generating a relational graph by using a multiple of stations in the railway timetable diagram and correlations between the stations; partitioning the relational graph according to a partition rule, where the partition rule reduces lines crossing in at least one page and/or section in at least one page in a reorganized railway timetable diagram, where the lines representing an association between respective stations along a path in the reorganized railway timetable diagram; and displaying a reorganized railway timetable diagram based on a result of the partitioning. An apparatus for reorganizing the display of a railway timetable diagram.

14 Claims, 8 Drawing Sheets

REORGANIZING DISPLAY OF A RAILWAY TIMETABLE DIAGRAM

CROSS-REFERENCE TO RELATED APPLICATION

This application claims priority under 35 U.S.C. §119 from Chinese Patent Application No. 201210021392.0 filed Jan. 31, 2012, the entire contents of which are incorporated herein by reference.

BACKGROUND OF THE INVENTION

1. Field of the Invention

The present invention is related to reorganizing the display of an image, and more specifically, to a method, apparatus, and related computer program product for reorganizing the display of a railway timetable diagram.

2. Description of the Related Art

In the railway transport field, a dispatcher has to schedule a number of trains every day. Each train involves a multitude of content, such as train number, departure time, arrival time, station of departure and terminal, etc., and also that a train needs to be hauled by one or more locomotives. Complex relationships exist among a train, a locomotive, and a railway network. For example, a train might change tractor locomotives from its departure to arrival, and a locomotive can draw different trains during different periods in a day. The dispatcher must be enabled to monitor states related to each train and each locomotive, as well as relationships between a train and a locomotive around the clock, to schedule the train and the locomotive based on the monitored information.

The dispatcher can obtain desired information from a railway timetable diagram. Typically, the railway timetable diagram displays operating conditions of trains and locomotives in a multiple of pages. Usually the railway timetable diagram is displayed in two-dimensional coordinates, with horizontal coordinates representing times and vertical coordinates representing stations which are usually displayed in various sections. For example, a cross point at a time t and a station s can represent that a train/locomotive is in the station s at the time t. Take a train as an example, when this train stops at stations s1, s2, . . . , sn at times t1, t2, . . . , to respectively, cross points c1, c2, . . . , cn in the railway timetable diagram can form a broken line which may be termed as a train leg. Like the train leg, a locomotive path is used for describing related time and location information of a locomotive.

However, the railway timetable diagram usually includes information about multiple trains and locomotives, so that a large amount of information is mixed together. In addition, a train leg and a locomotive path might traverse various sections in a page or even several pages. At this point, the dispatcher has to observe information in the various sections or even several pages between respective legs and paths. Inconvenient operations, cross-page lines, and cross-section lines can increase the probability of error. In the case that the dispatcher does not correctly monitor the railway timetable diagram, the efficiency of scheduling trains will be downgraded, and what is worse, accidents like train crashes might happen.

SUMMARY OF THE INVENTION

It is desired to provide a clearer and more identifiable railway timetable diagram to improve the display efficiency, and it is further desired to reduce circumstances as much as possible in which a train leg and a locomotive path are displayed crossing sections and pages. The present invention provides a method, apparatus, and computer program product for reorganizing display of a railway timetable diagram.

In one aspect of the present invention, a method of reorganizing the display of a railway timetable diagram to improve the display efficiency is provided. The method includes: generating a relational graph by using a plurality of stations in the railway timetable diagram and correlations between the plurality of stations; partitioning the relational graph according to a partition rule; and displaying a reorganized railway timetable diagram based on a result of the partitioning; wherein the partition rule reduces lines crossing at least one page and/or crossing at least one section in at least one page in the reorganized railway timetable diagram, the lines represent associations between respective stations along a path in the reorganized railway timetable diagram.

In another aspect of the present invention, there is provided an apparatus for reorganizing display of a railway timetable diagram so as to improve the display efficiency. The apparatus includes: generating means configured to generate a relational graph by using a plurality of stations in the railway timetable diagram and correlations between the plurality of stations; partitioning means configured to partition the relational graph according to a partition rule; and displaying means configured to display a reorganized railway timetable diagram based on a result of the partitioning; wherein the partition rule reduces lines crossing at least one page and/or crossing at least one section in at least one page in the reorganized railway timetable diagram, the lines representing associations between respective stations along a path in the reorganized railway timetable diagram.

By means of the various aspects of the present invention, the dynamic scheduling of trains and locomotives, the display efficiency can be improved and in turn, the probability of errors that are made when the dispatcher searches for cross-section and cross-page train legs and locomotive paths can be reduced, so as to assist the dispatchers' scheduling work and enable the dispatcher to be devoted to the scheduling of trains and locomotives.

BRIEF DESCRIPTION OF THE DRAWINGS

Features, advantages, and other aspects of various embodiments of the present invention will become more apparent from the following detailed description, when taken in conjunction with the figures illustrate several embodiments of the present invention in an exemplary rather than limiting manner.

DETAILED DESCRIPTION OF THE PREFERRED EMBODIMENT

Figure 1:
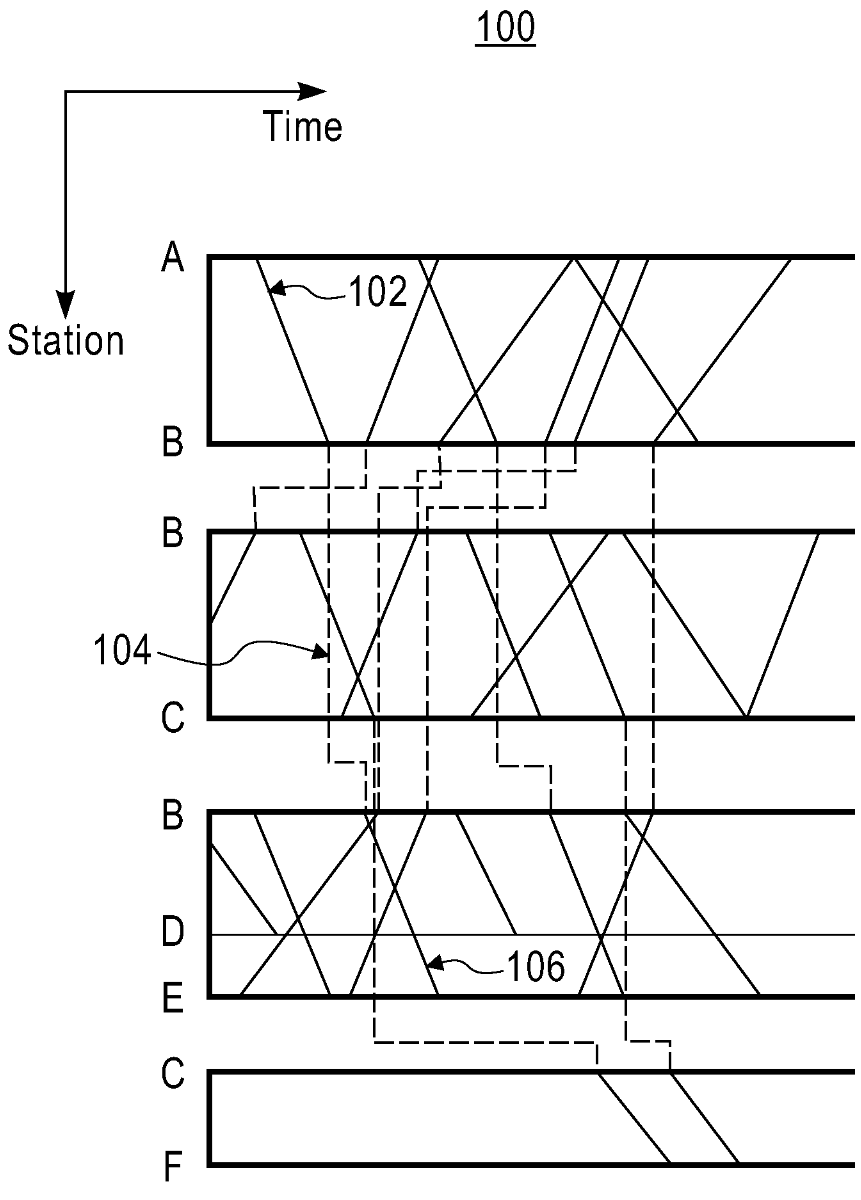
FIG. 1 is a schematic diagram showing a display page of a railway timetable diagram according to one aspect of the present invention.

As will be appreciated by one skilled in the art, aspects of the present invention can be implemented as a system, method, or computer program product. Accordingly, aspects of the present invention can take the form entirely as hardware, entirely as software (including firmware, resident software, micro-code, etc.) or combining software and hardware aspects that can all generally be referred to as a "circuit," "module," or "system." Aspects of the present invention can take the form of a computer program product embedded in one or more computer readable medium(s) having computer readable program code embedded thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, or infrared semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium can be any tangible medium that can contain, or store a program for use by or in connection with an instruction execution system, apparatus, or device.

A computer readable signal medium can include a propagated data signal with computer readable program code embedded, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device. Program code embedded on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. The remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to various aspects of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus, or other device to produce a computer implemented process such as instructions which execute on the computer or other programmable apparatus and provide processes for implementing the functions/acts specified in the flowchart and/or block diagram block or blocks.

The flowchart and block diagrams in the figures illustrate the architecture, functionality, and operation of possible implementations of systems, methods and computer program products according to various aspects of the present invention. Each block in the flowchart or block diagrams can represent a module, segment, or portion of code, which includes one or more executable instructions for implementing the specified logical function(s). In some alternative implementations, the functions noted in the block can occur out of the order noted in the figures. For example, two blocks illustrated in succession can, in fact, be executed substantially concurrently, or the blocks can sometimes be executed in the reverse order, depending on the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that these aspects of the present invention are only to enable those skilled in the art to better understand and further implement the present invention, not intended to limit the scope of the present invention in any manner.

FIG. 1 is a schematic diagram showing a display page 100 of a railway timetable diagram according to an aspect of the present invention. This figure illustrates an example of only one display page. In FIG. 1, horizontal coordinates represent times and stations along train legs and locomotive paths. For facilitating display, a time scale in horizontal coordinates is omitted in this figure. In addition, vertical coordinates illustrate 4 sections (i.e., sections A-B, B-C, B-D-E, and C-F). Also for facilitating display, other stations between stations of the departure and terminal are omitted. For example, the section A-B can further comprise stations A1, A2, . . . , Am.

In FIG. 1, an oblique line within a section represents a train leg, and a dotted line within a section represents a locomotive path. A detailed explanation of FIG. 1 will be presented below. An oblique line 102 within the section A-B represents that a certain train leaves for a station B from a station A, and the time consumed is a horizontal coordinate shift between the starting point and ending point of oblique line 102; similarly, an oblique line 106 within the section B-D-E represents that this train leaves for a station E from station B. The ending point of oblique line 102 and the starting point of oblique line 106 are connected by a dotted line 104 that represents a locomotive path. The vertical coordinates of both the starting point and ending point of dotted line 104 represent station B, while the horizontal coordinates thereof have a shift; this indicates that time for which the locomotive stops at station B is the shift of the horizontal coordinates. It should be noted that at this point, dotted line 104 represents a cross-section line that crosses section B-C; when section B-D-E in FIG. 1 is illustrated in another page, dotted line 104 becomes a line connecting a section within two pages, namely a cross-page line.

As is clear from FIG. 1, the overlap of train legs and locomotive paths makes it difficult to identify the railway timetable diagram. It should be noted that FIG. 1 is merely for illustration and many details are omitted, such as train number, locomotive model, etc. In a real application a multiple of pages can be included and an amount of details have to be indicated, a railway timetable diagram will become more confusing and indiscernible.

Multiple improved solutions have been proposed. For example, different locomotive paths can be displayed in different colors, or all locomotive paths may be simultaneously displayed in one page. However, these solutions have such a defect that they cannot effectively increase the display efficiency because only topological information of a railway network is considered while dynamic scheduling of trains and locomotives in the running period is ignored.

Figure 2:
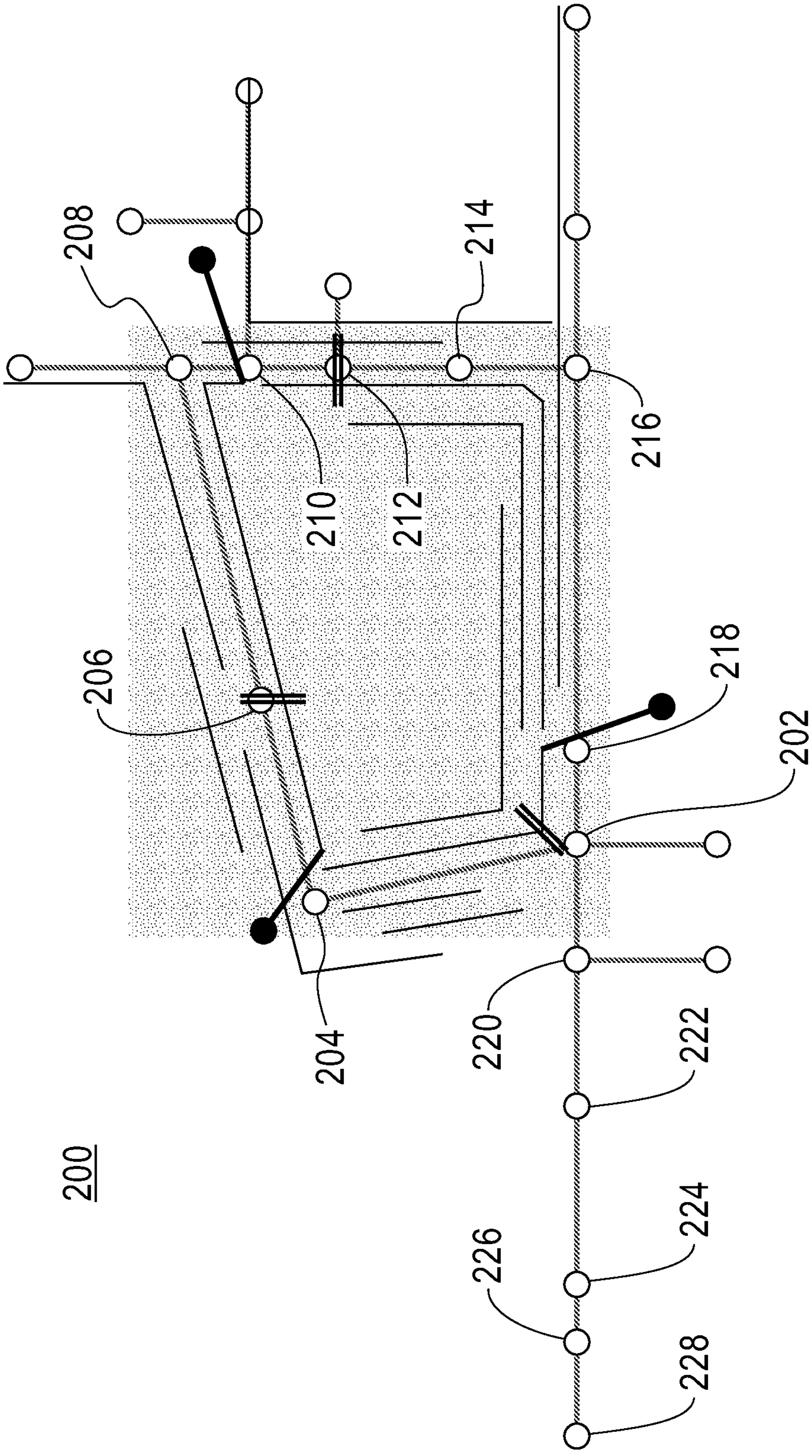
FIG. 2 is a schematic diagram showing a diagram of how to partition a plurality of stations in a railway timetable diagram into sections according to one aspect of the present invention.

FIG. 2 is a schematic diagram showing a graph 200 of how to partition multiple stations in a railway timetable diagram into sections according to an aspect of the present invention. Only stations 202-218 in the shadowed area in FIG. 2 are taken as an example for illustrating how to partition a plurality of stations into sections. For example, a ring route 202-218 involves three train numbers as illustrated in Table 1.

TABLE 1

| Train Information | | |
|---|---|---|
| Number | Train Number | Station |
| 1 | D1 | 218-202-204 |
| 2 | D2 | 204-206-208-210 |
| 3 | D3 | 210-212-214-216-218 |

According to the prior art, stations are partitioned into sections based typically on railway network information. For example, in the case that each section comprises 3-6 stations, 3 sections are obtained by using stations 202, 206, and 212 as partitioning points based on the railway network, which are Section 1: [202, 204, 206];

Section 2: [206, 208, 210]; and

Section 3: [210, 212, 214, 216, 218, 202].

However, using stations 202, 206, and 212 as partition points results in that stations involved in each of the three train numbers in Table 1 are distributed in 2 sections. When displaying a railway timetable diagram based on such partition, suppose traction locomotives of each train remain unchanged, and then data related to each train number needs to be displayed in multiple sections. This results in an unnecessary cross-section display of train legs and locomotive paths. Although not illustrated in FIG. 2, a cross-page display can be further caused if more stations are involved.

According to one aspect of the present invention, partition can be implemented based on dynamic settings of a path (e.g., including a train leg and a locomotive path), so as to reduce the possibility of displaying the path in a section-cross and page-cross manner as much as possible. For example, an analysis can illustrate that the starting points and ending points of the train numbers D1, D2, and D3 involve stations 218, 204, and 210 respectively, which can be used as partition points. Then, the following 3 sections are obtained from path-based partition:

Section 1': [218, 202, 204];

Section 2': [204, 206, 208, 210]; and

Section 3': [210, 212, 214, 216, 218].

At this point, paths from D1 to D3 can be displayed in the three sections 1' to 3', respectively, so as to alleviate or eliminate the problem of cross-section display. FIG. 2 merely illustrates a principle of obtaining sections from partition according to one aspect of the present invention. Detailed technical details will be described below.

Figure 3:
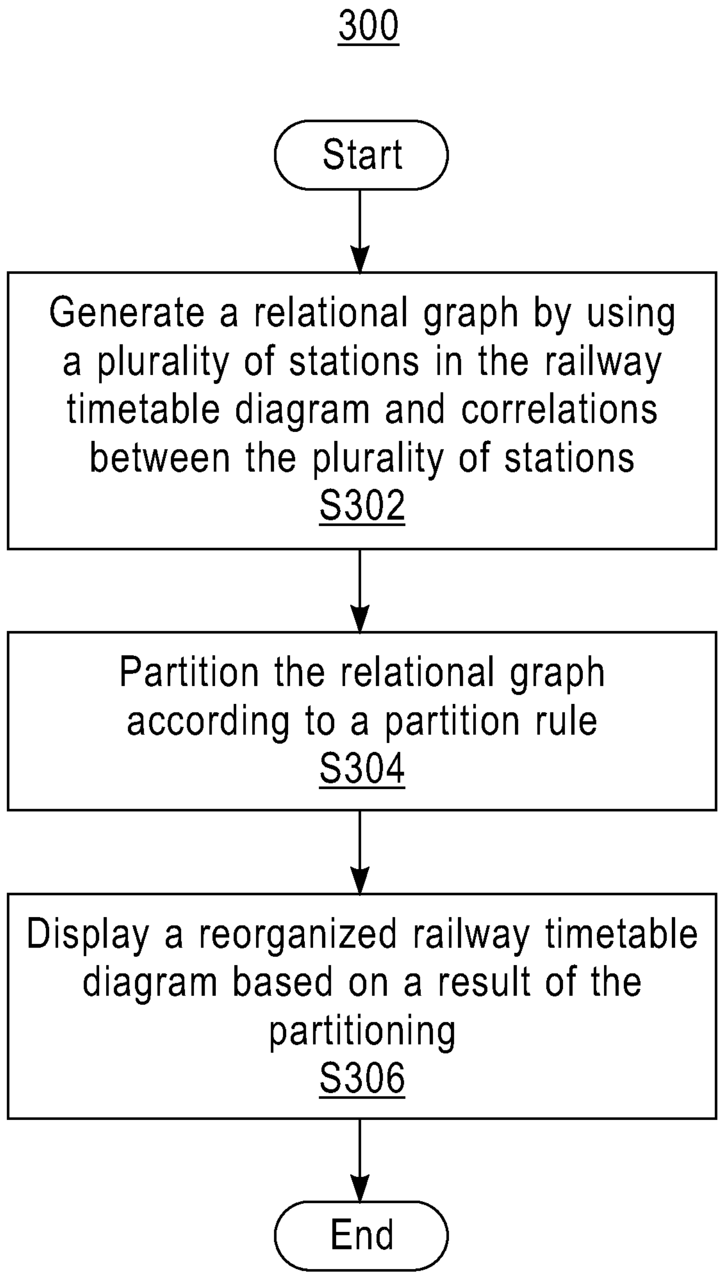
FIG. 3 is a schematic diagram showing a flowchart of a method of reorganizing the display of a railway timetable diagram according to one aspect of the present invention.

FIG. 3 is a schematic diagram showing a flowchart 300 of a method of reorganizing display of a railway timetable diagram according to one aspect of the present invention. According to one aspect of the present invention, there is proposed a method of reorganizing display of a railway timetable diagram to improve the display efficiency. The method includes: generating a relational graph by using a plurality of stations in the railway timetable diagram and correlations between the plurality of stations; partitioning the relational graph according to a partition rule; and displaying a reorganized railway timetable diagram based on a result of the partitioning; where the partition rule reduces lines crossing at least one page and/or crossing at least one section in at least one page in the reorganized railway timetable diagram, the lines represent associations between respective stations along a path in the reorganized railway timetable diagram.

In step S302, a relational graph is generated by using a plurality of stations and correlations between the stations in a railway timetable diagram. According to one aspect of the present invention, to-be-displayed stations can be partitioned to different pages and different sections in a page based on dynamic scheduling of trains and locomotives, so as to reduce cross-page and cross-section lines. In one aspect of the present invention, a relational graph describing stations and correlations between these stations can be extracted, and partition can be implemented based on these stations' correlation strength.

In step S304, the relational graph is partitioned according to a partition rule. The partition rule can be based on a minimal cost to partition relational graph generated in step S302. In a specific example of the railway timetable diagram, the minimal cost means reducing lines crossing at least one page and/or crossing at least one section in one page of the reorganized railway timetable diagram as much as possible, so as to alleviate or eliminate the chaos of the overlapping display of cross-page and/or cross-section lines in the prior art and further improve the display efficiency.

When the railway timetable diagram include less stations, a plurality of sections including corresponding stations can be displayed in only one page, at which point no cross-page line exists. Lines crossing at least one section in the page can be reduced by applying the present invention. When the railway timetable diagram involves a plurality of pages, not only lines crossing at least one section in one page but also lines crossing at least one page can be reduced by applying the present invention.

In step S306, the reorganized railway timetable diagram is displayed based on a result from partitioning. For example, regarding the example illustrated in FIG. 2, after stations 218, 204, and 210 are determined to be used as partition points, the reorganized railway timetable diagram can be displayed in section 1', section 2', and section 3' based on the result of partitioning, respectively.

According to one aspect of the present invention, generating a relational graph by using a plurality of stations in a railway timetable diagram and correlations between the plurality of stations comprises: forming sub-graphs based on paths in the railway timetable diagram; and consolidating the sub-graphs to form the relational graph.

It should be noted that since the railway timetable diagram can involve dozens of paths (including train legs and locomotive paths), respective sub-graphs have to be generated for these paths. One sub-graph can include one or more paths. For example, one sub-graph can include a sub-graph of relevant paths of short-distance trains only; another sub-graph can include a sub-graph of relevant paths of long-distance trains; or a sub-graph can be generated based on other factors, for example, whether a train is an express train or a slow train.

The present invention needs to obtain the representation of all stations in the to-be-reorganized railway timetable diagram and correlations between the all stations; the respective sub-graphs generated previously need to be consolidated. To “consolidate” means accumulating correlations between the same stations to obtain an overall impact of each path on correlations between stations. For example, regarding two sub-graphs comprising the station A and the station B, if a correlation between station A and station B equals to 8 in the first sub-graph and 6 in the second sub-graph, then a correlation between station A and station B in the consolidated overall relational graph equals to 8+6=14.

According to one aspect of the present invention, the forming sub-graphs based on paths in the railway timetable diagram includes: constructing a first node and a second node in the relational graph by using a first station and a second station that follow in succession along a path; and using a correlation between the first station and the second station as a weight of an edge between the first node and the second node.

It should be noted that in the present invention whether two stations have a correlation or not depends on judgment as to whether these two stations are two stations that follow in succession along a train leg or a locomotive path. If a result of the judgment is “yes,” then these two stations have a correlation (for example, represented by a positive integer); otherwise, these two stations have no correlation (for example, represented by “0”).

In the example illustrated in FIG. 1, a train leg 102 exists between station A and station B. Then, a first node and a second node are constructed to represent station A and station B, respectively, in the relational graph; and a correlation between station A and station B is used as a weight of an edge between the first node and the second node. In addition, based on a train leg 106 between station B and station E in FIG. 1, corresponding nodes and a corresponding edge can be constructed. Similarly, a sub-graph can be formed for a locomotive path.

In one aspect of the present invention, further includes determining a first station and a second station based on a railway network related to paths. Since stations which a path passes by depend on topological information of a railway network itself, respective stations along the path need to be determined the railway network information.

Regarding the example in FIG. 2, for example, train number D1 departs from station 218 to station 204, so stations which train number D1 passes by during the whole journey 218-202-204 can be learned from the railway network information. FIG. 2 omits other stations between stations represented by 202 to 208. For example, other stations can exist between station 218 and station 202.

In one aspect of the present invention, the paths can be at least one of a train leg and a locomotive path. It should be noted that since one train can be hauled by one or more locomotives, a train leg of the train and locomotive paths of the one or more locomotives hauling the train have associations. In one aspect of the present invention, a train leg and a locomotive path can be taken into overall account so as to globally reduce relevant cross-page and cross-section lines of these two kinds of paths. However, a train leg or a locomotive path can be considered separately based on specific demands, at which point relevant cross-page and cross-section lines of a certain path can be reduced separately.

In one aspect of the present invention, further includes: assigning a higher value to correlation between two successive stations along a train leg; and assigning a lower value to correlation between two successive stations along a locomotive path.

Since one train can be hauled by one or more locomotives, a correlation between stations along a train leg is higher than a correlation between stations along a locomotive path. Hence, different correlation values can be used to represent correlation strengths between two successive stations along a train leg and along a locomotive path. For example, a correlation between two stations A and B along train leg 102 illustrated in FIG. 1 can be set to 3, where a correlation between two stations B and C along locomotive path 104 can be set to 1. Based on a specific aspect of the present invention, a correlation ratio of a train leg to a locomotive path may be set to 3:1 or other value like 4:1.

In one aspect of the present invention, the partitioning the relational graph according to a partition rule includes: partitioning the relational graph into at least one block, and partitioning at least one block into at least one group. Now referring to FIGS. 4A and 4B, detailed description is presented below.

Figure 4A:
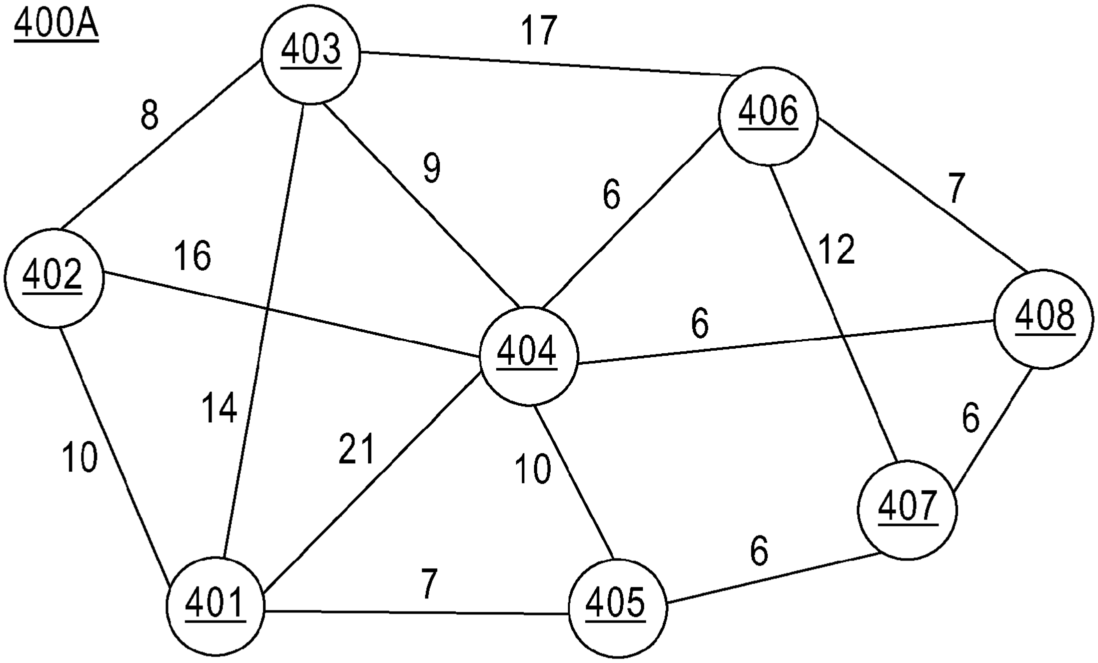
FIG. 4A is a schematic diagram showing a relational graph as generated according to one aspect of the present invention.
Figure 4B:
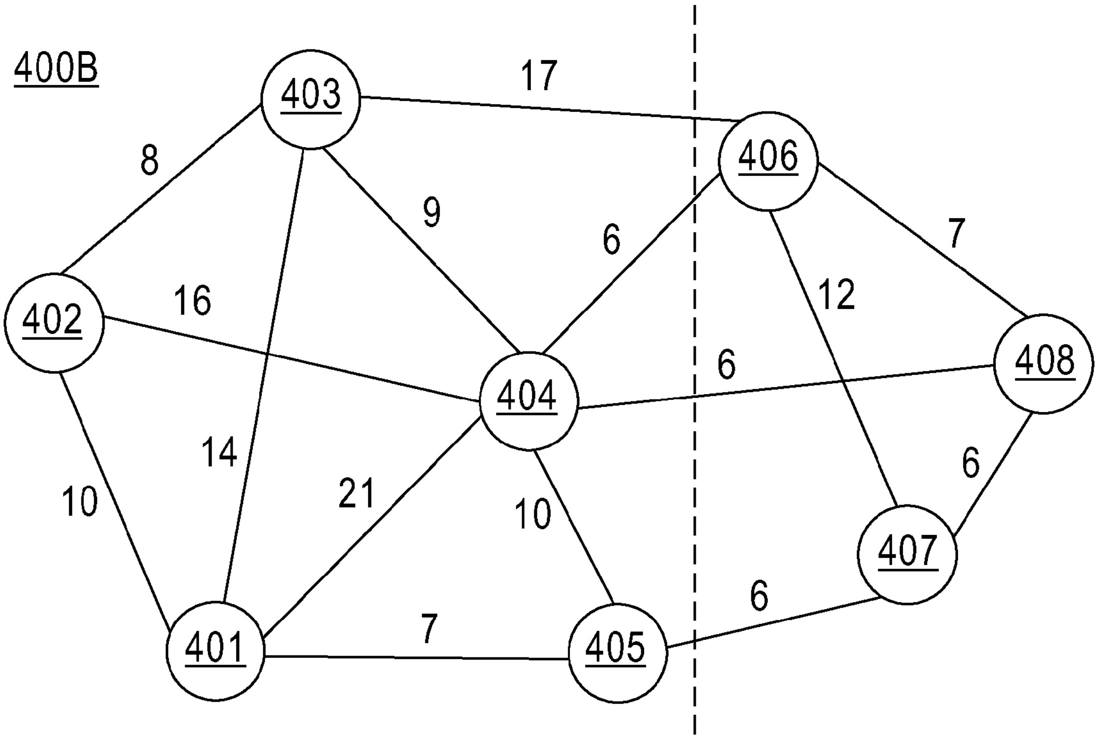
FIG. 4B is a schematic diagram showing a relational graph as partitioned according to one aspect of the present invention.

FIG. 4A is a schematic diagram showing a relational graph 400A generated according to one aspect of the present invention; FIG. 4B shows a relational graph 400B partitioned according to one aspect of the present invention. In one aspect of the present invention, a relational graph can be partitioned by a dotted line in FIG. 4B, at which point the partition cost is minimal.

FIGS. 4A and 4B illustrate a relational graph including only 8 stations, where in actual application scenarios dozens of stations can be involved. In addition, when there is a sub-graph formed on the basis of more paths, weights of respective edges of the consolidated relational graph will become greater. Since each of FIGS. 4A and 4B includes only 8 stations, a railway timetable diagram related to these stations can be displayed in one page. The partition in FIG. 4B refers to section partition, and stations on both sides of the dotted line can be displayed in two sections, respectively. In case of more stations, the relational graph can be partitioned into at least one block (where a block corresponds to a page in a reorganized relational graph), and subsequently at least one block is further partitioned into at least one group (where a group corresponds to a section in a reorganized relational graph).

Detailed description is presented now on how to partition a relational graph into at least one block. Regarding the relational graph as illustrated in FIG. 4A, since this figure contains 8 nodes, relational graph 400A can be represented by an 8×8 matrix A. In the matrix A, each element A(i,j) represents a weight of an edge between a station i and a station j. For the stations i and j that have no connection relationship, a value of the element A(i,j) is equal to "0." Since graph 400A is an undirected diagram, matrix A is a symmetrical matrix and a value of each element at the diagonal is equal to "0" (i.e., there is no edge between the station i and itself). At this point, matrix A is as below:

$$A = \begin{bmatrix} 0 & 10 & 14 & 21 & 7 & 0 & 0 & 0 \\ 10 & 0 & 8 & 16 & 0 & 0 & 0 & 0 \\ 14 & 8 & 0 & 9 & 0 & 17 & 0 & 0 \\ 21 & 16 & 9 & 0 & 10 & 6 & 0 & 6 \\ 7 & 0 & 0 & 10 & 0 & 0 & 6 & 0 \\ 0 & 0 & 17 & 6 & 0 & 0 & 12 & 7 \\ 0 & 0 & 0 & 0 & 6 & 12 & 0 & 6 \\ 0 & 0 & 0 & 6 & 0 & 7 & 6 & 0 \end{bmatrix}$$

The Spectral Graph Theory is applied to matrix A so as to partition the graph at the minimal cost. Specifically, a diagonal matrix D is constructed as below:

$$D = \begin{bmatrix} a_{0,0} & & & & & & & \\ & \cdots & & & & & & \\ & & a_{i,i} & & & & & \\ & & & \cdots & & & & \\ & & & & \cdots & & & \\ & & & & & \cdots & & \\ & & & & & & \cdots & \\ & & & & & & & a_{7,7} \end{bmatrix},$$

where for $0 \le i \le 7$, $a_{i,i} = \Sigma_{j=0}^{7} a_{i,j}$

Next, eigen-decomposition of a matrix $L=D-A$ (or $I=D^{-1/2}AD^{-1/2}$) is implemented. After all eigenvalues in the eigenspace of L are sorted in an ascending order, a corresponding eigenvector $v_k$ is selected from the second eigenvalue. A value symbol of each element in $v_k$ represents a block where a station is located. That is, in $v_k$, element values greater than or equal to 0 are partitioned into one block, and element values less than 0 are partitioned into another block. A station can be partitioned into two portions via one eigenvector. Subsequently, the resulting two blocks can be further partitioned using an eigenvector corresponding to the other eigenvalue, so as to ensure that the cost for each partition is minimal.

Termination conditions of partition include: 1) the cost for partition; 2) the number of stations included in a block (or the number of desired blocks). According to concrete demands, the number of stations included in a block can be set as a parameter, and the cost for partition is determined by an eigenvalue. If a currently selected eigenvlaue is much greater than the previous eigenvalue, it indicates that the cost for partition will increase. At this point, if a result of the current partition is close to the termination conditions, the partition can be terminated.

The theory of further partitioning at least one block into at least one group is the same as partitioning a relational graph into a block. The difference is that during grouping, an inputted matrix A' is a matrix that includes stations in the block resulted from the partition and weights of edges between the stations. Based on the foregoing description, those skilled in the art can further partition a block into at least one group.

In one aspect of the present invention, further includes: sorting groups in at least one block. The sorting serves a purpose of determining in which order the plurality of sections are displayed in one page.

The procedure of sorting the groups in the at least one block can be an exhaustive procedure. Suppose the number of groups in one block is no more than 8, the maximum permutations and combinations do not exceed 8 ! (40320, the possibility of these combinations can be reduced to several hundred based on the principle of arranging adjacent blocks as far as possible and separating nonadjacent blocks). Then, statistics is made to the number of cross-page and cross-section lines caused by each sorting solution, and then a solution producing the minimal number is selected.

In one aspect of the present invention, displaying the reorganized railway timetable diagram based on a result of the partitioning includes: displaying, in at least one page, at least one section corresponding to at least one group in at least one block, according to a result of the sorting; and displaying, in at least one section, stations corresponding to nodes in at least one group.

Through the partition procedure described above, the relational graph is partitioned into at least one block, at least one block is partitioned into at least one group, and the sorting order of groups in a specific block is obtained. Hence, when displaying the reorganized railway timetable diagram, corresponding stations are displayed in different pages and sections only according to block and group.

In one aspect of the present invention, the partition rule is Spectral Graph Theory. As the principles on which the respective aspects of the present invention are outlined above, details of Spectral Graph Theory are omitted here.

In one aspect of the present invention, the following data structures are mainly involved:

1. train {train number, departure time, station of departure, arrival time, terminal, train type, page to which the train belongs, section to which the train belongs};

2. locomotive route {locomotive model, locomotive number, train hauled by the locomotive previously, train to be hauled by the locomotive next}. A locomotive path can include a multiple of locomotive routes.

3. page {page number};

4. section {section number, page to which the section belongs, position where the section is sorted in the page};

5. railway network {station, interval}; where an interval is a line between two adjacent stations and is represented as (station, station).

The present invention can be implemented using the foregoing data structure. For example, respective information related to a train and a railway network can be read from a to-be-reorganized railway timetable diagram and stored in "train" and "railway network" data structures, respectively. Subsequently, a plurality of stations in a to-be-processed railway timetable diagram and correlations between plurality of stations can be extracted from these data structures. For example, by combining information on respective stations and intervals in the "railway network" data structure with information on station of departure and terminal in the "train" data structure, all stations which the train has passed by can be obtained, and it can be considered that two successive stations which the train has passed by have a correlation. Based on the foregoing description, those skilled in the art can further construct a "locomotive route" data structure. After extracting a plurality of stations and correlations between the multiple of stations, those skilled in the art can construct the matrix A based on the above-described manner.

In one aspect of the present invention, information related to pages and sections can be further read from the to-be-reorganized railway timetable diagram. Upon completion of the reorganize operation, the reorganized railway timetable diagram can be displayed based on the partitioned relational graph. For example, suppose the relational graph is partitioned into a plurality of blocks each including multiple groups, then the blocks and the groups in the relational graph can be mapped to the pages and the sections in the reorganized railway timetable diagram based on the foregoing data structure.

The foregoing data structures 1-5 are merely examples for implementing the present invention, and those skilled in the art can construct other data structures based on the description presented in the specification.

Figure 5:
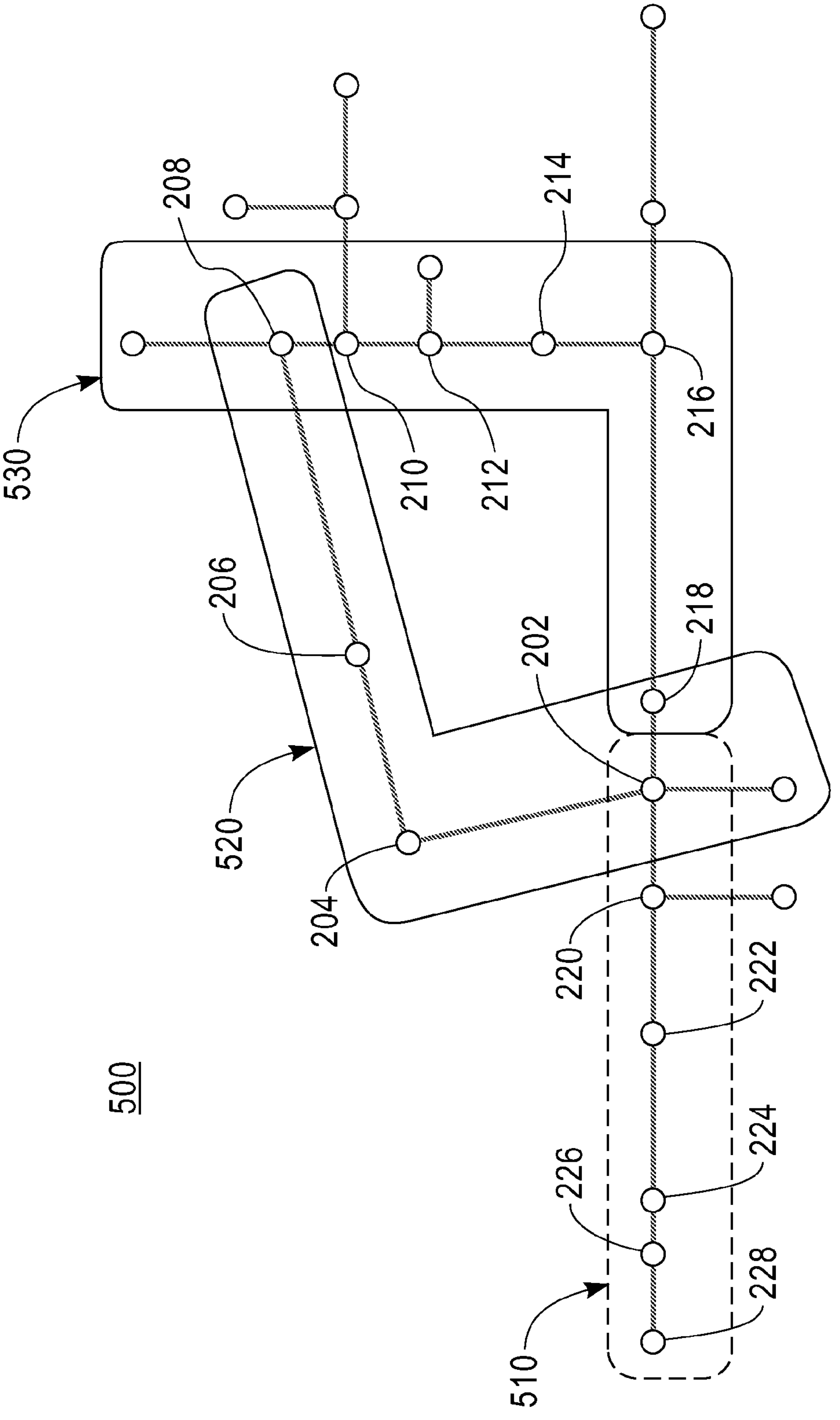
FIG. 5 is a schematic diagram showing a corresponding relationship between a railway network and respective pages in a reorganized railway timetable diagram according to one aspect of the present invention.

FIG. 5 is a schematic diagram showing a corresponding relationship between a railway network and pages in a reorganized railway timetable diagram according to one aspect of the present invention. For purposes of clarity, not all stations along the railway line; for example, stations can exist between stations 228 to 226. Through the above-described steps of partitioning, the relational graph is partitioned into a multiple of blocks each including a plurality of groups, which blocks respectively correspond to three areas illustrated in FIG. 5, an area 510, an area 520, and an area 530.

Take only area 510 illustrated in a dotted-line block as an example. Stations in area 510 can be illustrated in one page, and stations 226, 224, 222, and 220 are used as partition points. For example, stations between station 228 and station 226 can be displayed in one section. Similarly, stations in blocks 520 and 530 can be displayed in a second page and a third page, respectively.

Figure 6:
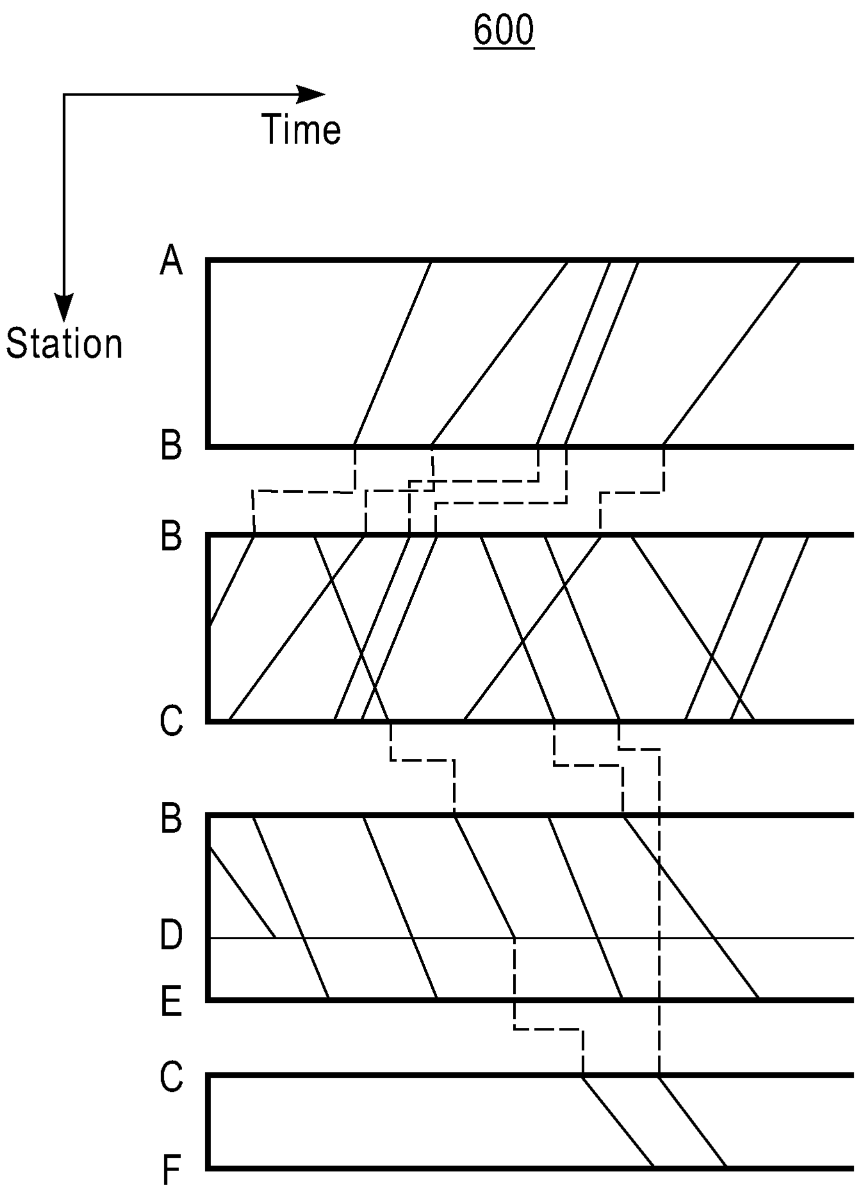
FIG. 6 is a schematic diagram showing a display page of a reorganized railway timetable diagram according to one aspect of the present invention.

FIG. 6 is a schematic diagram showing a display page 600 of a reorganized railway timetable diagram according to one aspect of the present invention. As illustrated in FIG. 6, cross-section lines are reduced greatly, thereby improving the display efficiency and in turn, decreasing the probability of errors that are made when the dispatcher searches for cross-section and cross-page train legs and locomotive paths.

Figure 7:
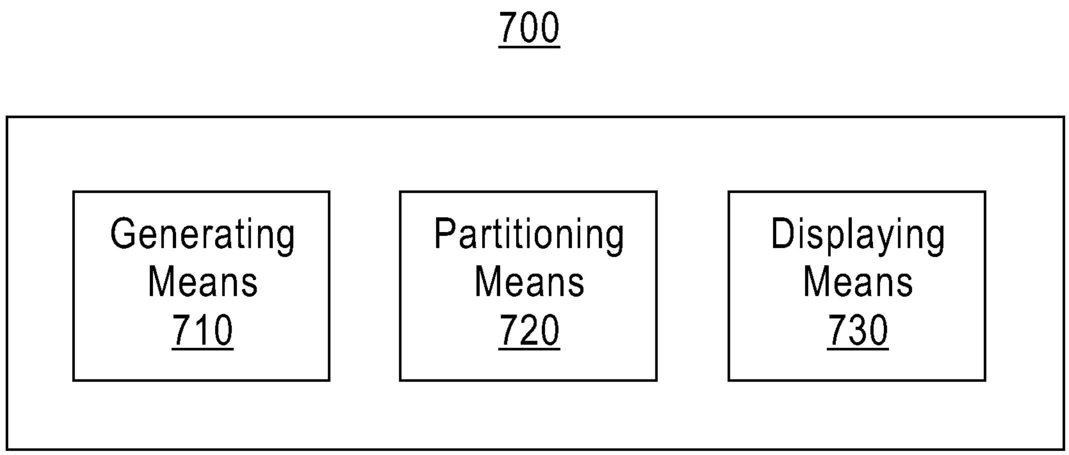
FIG. 7 is a schematic diagram showing a block diagram of an apparatus for reorganizing the display of a railway timetable diagram according to one aspect of the present invention.

FIG. 7 is a schematic diagram showing a block diagram 700 of an apparatus for reorganizing a railway timetable diagram according to one aspect of the present invention. In one aspect of the present invention, there is provided an apparatus for reorganizing the display of a railway timetable diagram so as to improve display efficiency. The apparatus includes: a generating means 710 configured to generate a relational graph by using a plurality of stations in the railway timetable diagram and correlations between the plurality of stations; a partitioning means 720 configured to partition the relational graph according to a partition rule; and a displaying means 730 configured to display a reorganized railway timetable diagram based on a result of the partition; where partition rule reduces lines crossing at least one page and/or crossing at least one section in at least one page in the reorganized railway timetable diagram, the lines representing associations between respective stations along a path in the reorganized railway timetable diagram.

In one aspect of the present invention, generating means 710 includes: a forming means configured to form sub-graphs based on paths in the railway timetable diagram; and consolidating means configured to consolidate the sub-graphs to form the relational graph.

In one aspect of the present invention, the forming means includes: constructing means configured to construct a first node and a second node in the relational graph by using a first station and a second station that follow in succession along a path; and weighting means configured to use a correlation between the first station and the second station as a weight of an edge between the first node and the second node.

In one aspect of the present invention, the constructing means further includes: determining means configured to determine the first station and the second station based on a railway network involved by the paths.

In one aspect of the present invention, the path is at least one of a train leg and a locomotive path.

In one aspect of the present invention, the generating means further includes: assigning means configured to assign a higher value to correlation between two successive stations along a train leg and assign a lower value to correlation between two successive stations along a locomotive path.

In one aspect of the present invention, the partitioning means include: first partitioning means configured to partition the relational graph into at least one block; and second partitioning means configured to further partition the at least one block into at least one group.

In one aspect of the present invention, the partitioning means further include: sorting means configured to sort groups in at least one block.

In one aspect of the present invention, the displaying means includes: first displaying means configured to display, in at least one page, at least one section corresponding to at least one group in at least one block, according to a result of the sorting; and second displaying means configured to display, in at least one section, stations corresponding to nodes in at least one group.

In one aspect of the present invention, the partition rule is Spectral Graph Theory.

Figure 8:
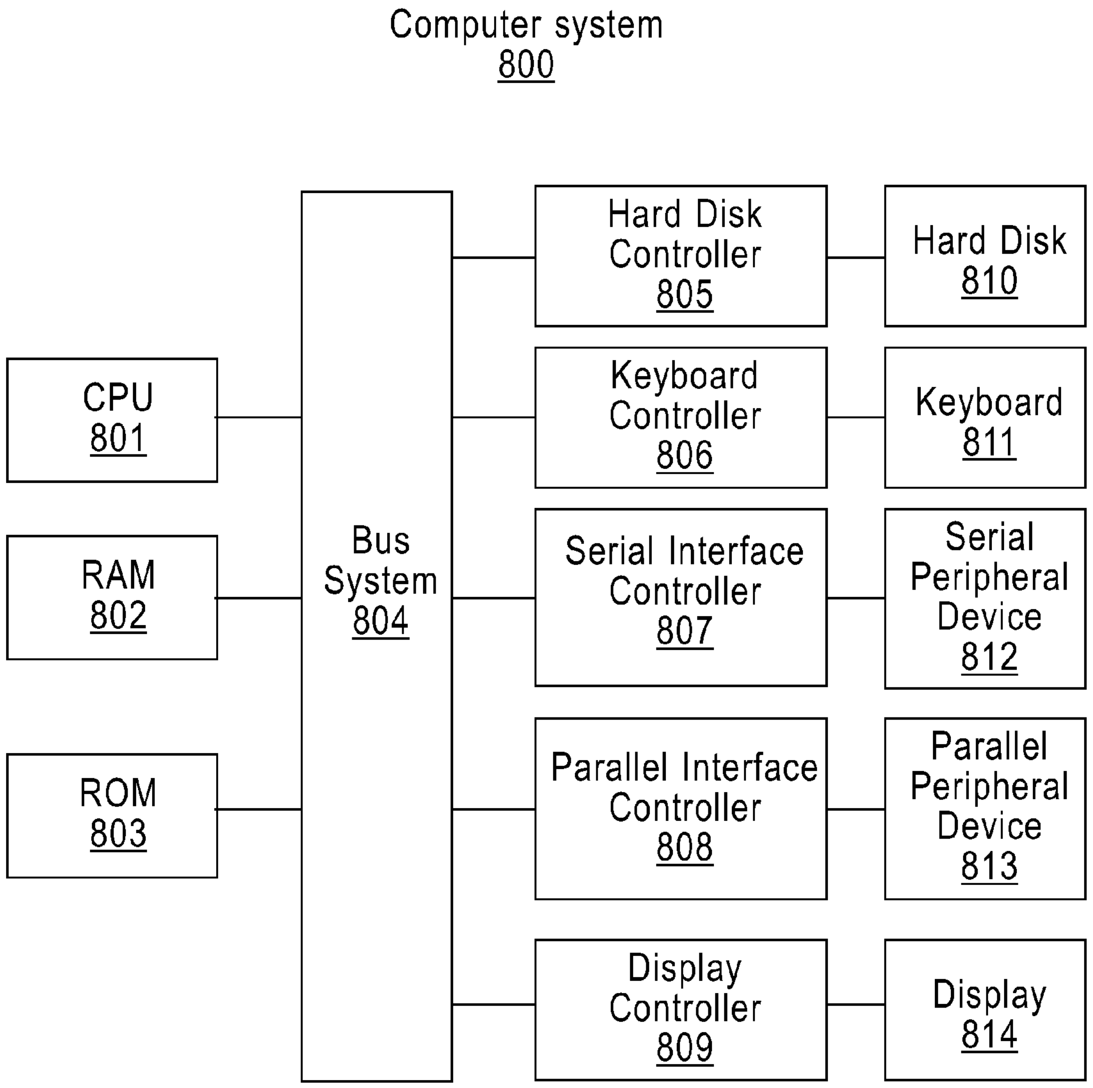
FIG. 8 is a schematic diagram showing a computer system which is applicable to implement the various aspects of the present invention.

FIG. 8 is a schematic diagram showing a computer system 800 which is applicable to implement the present invention. As illustrated in FIG. 8, computer system 800 can include: CPU (Central Process Unit) 801, RAM (Random Access Memory) 802, ROM (Read Only Memory) 803, System Bus 804, Hard Drive Controller 805, Keyboard Controller 806, Serial Interface Controller 807, Parallel Interface Controller 808, Display Controller 809, Hard Drive 810, Keyboard 811, Serial Peripheral Equipment 812, Parallel Peripheral Equipment 813, and Display 814. Among above devices, CPU 801, RAM 802, ROM 803, Hard Drive Controller 805, Keyboard Controller 806, Serial Interface Controller 807, Parallel Interface Controller 808, and Display Controller 809 are coupled to System Bus 804. Hard Drive 810 is coupled to Hard Drive Controller 805. Keyboard 811 is coupled to Keyboard Controller 806. Serial Peripheral Equipment 812 is coupled to Serial Interface Controller 807. Parallel Peripheral Equipment 813 is coupled to Parallel Interface Controller 808. Display 814 is coupled to Display Controller 809. It should be understood that the structure as illustrated in FIG. 8 is not meant to limit the present invention. Some devices can be added to or removed from computer system 800 based on specific situations.

Many modifications and variations will be apparent to those of ordinary skill in the art without departing from the scope of the described aspects of the present invention. The terminology used was chosen to best explain the principles of the present invention, the practical application or technical improvement over technologies found in the marketplace, or to enable others of ordinary skill in the art to understand the present invention disclosed.

The invention claimed is:

1. A method of reorganizing display of a railway timetable diagram, comprising:

generating, using a hardware processor device, a relational graph by using a plurality of stations in the railway timetable diagram and correlations between the plurality of stations, a correlation between two stations existing when the two stations follow in succession along a path, the path comprising at least one of a train leg and a locomotive path;

assigning a higher value to correlation between two successive stations along a train leg; and assigning a lower value to correlation between two successive stations along a locomotive path; said generating comprising: forming sub-graphs based on paths in the railway timetable diagram; and consolidating the sub-graphs to form the relational graph, wherein said consolidating comprises: accumulating correlations between the same stations to obtain an overall impact of each path on correlations between stations;

partitioning, using the hardware processor device, the relational graph according to a partition rule, wherein the partition rule reduces lines crossing in at least one page and/or section in at least one page in a reorganized railway timetable diagram, wherein the lines representing an association between respective stations along a path in the reorganized railway timetable diagram; and displaying on an associated display device in communication with said hardware processor the reorganized railway timetable diagram based on a result of the partitioning.

2. The method according to claim 1, wherein forming the sub-graphs based on paths in the railway timetable diagram further comprising:

constructing a first node and a second node in the relational graph by using a first station and a second station that are in succession along the path; and using a correlation between the first station and the second station as a weight of an edge between the first node and the second node.

3. The method according to claim 2, further comprising: determining the first station and the second station based on a railway network involved by the paths.

4. The method according to claim 1, wherein the partitioning the relational graph according to a partition rule further comprising:

partitioning the relational graph into at least one block, and further partitioning at least one block into at least one group.

5. The method according to claim 4, further comprising: sorting groups to contain at least one block.

6. The method according to claim 5, wherein displaying a reorganized railway timetable diagram based on a result of partitioning further comprising:

displaying as a result of the sorting, in at least one page, at least one section corresponding to at least one group in at least one block; and displaying, in at least one section, stations corresponding to nodes in at least one group.

7. The method according to claim 1, wherein the partition rule is a Spectral Graph Theory.

8. An apparatus for reorganizing display of a railway timetable diagram, the apparatus comprising:

a memory storage device;

a hardware processor operatively connected to said memory device and configured to:

generate a relational graph by using a plurality of stations in the railway timetable diagram and correlations between the plurality of stations, a correlation between two stations existing when the two stations follow in succession along a path, the path comprising at least one of a train leg and a locomotive path; wherein to generate a relational graph, said hardware processor is further configured to:

assign a higher value to correlation between two successive stations along a train leg; and assigning a lower value to correlation between two successive stations along a locomotive path;

form sub-graphs based on paths in the railway timetable diagram; and consolidate the sub-graphs to form the relational graph, wherein said consolidating comprises: accumulating correlations between the same stations to obtain an overall impact of each path on correlations between stations;

partition the relational graph according to a partition rule, wherein the partition rule reduces lines crossing at least one page and/or crossing at least one section in at least one page in a reorganized railway timetable diagram, wherein the lines represent associations between respective stations along a path in the reorganized railway timetable diagram; and display on an associated display device a reorganized railway timetable diagram based on a result of the partitioning.

9. The apparatus according to claim 8, wherein to form sub-graphs, said hardware processor is further configured to:

construct a first node and a second node in the relational graph by using a first station and a second station that follow in succession along the path; and use a correlation between the first station and the second station as a weight of an edge between the first node and the second node.

10. The apparatus according to claim 9, wherein to construct the first and second node, said hardware processor is further configured to:

determine the first station and the second station based on a railway network involved by the paths.

11. The apparatus according to claim 8, wherein to partition, said hardware processor is further configured to: partition the relational graph into at least one block; and further partition at least one block into at least one group.

12. The apparatus according to claim 11, wherein to partition, said hardware processor is further configured to: sort groups into at least one block.

13. The apparatus according to claim 12, wherein to display, said hardware processor is further configured to:

display, in at least one page, at least one section corresponding to at least one group in at least one block, according to a result of the sorting; and display, in at least one section, stations corresponding to nodes in at least one group.

14. The apparatus according to claim 8, wherein the partition rule is a Spectral Graph Theory.

* * * * *